No. 885,651. PATENTED APR. 21, 1908.
J. A. SCOTT.
ROD PACKING.
APPLICATION FILED MAY 14, 1906.
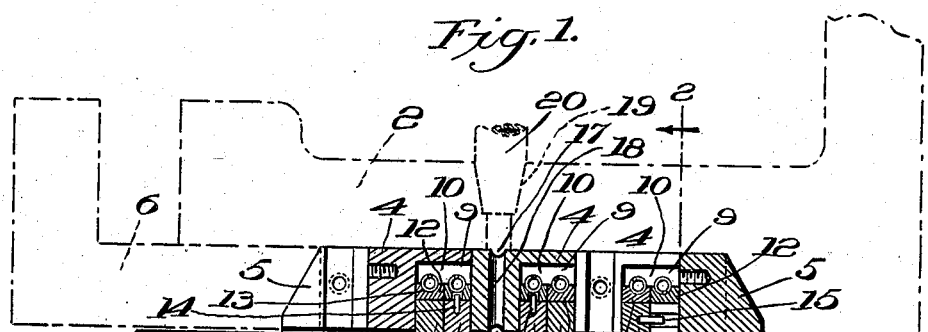
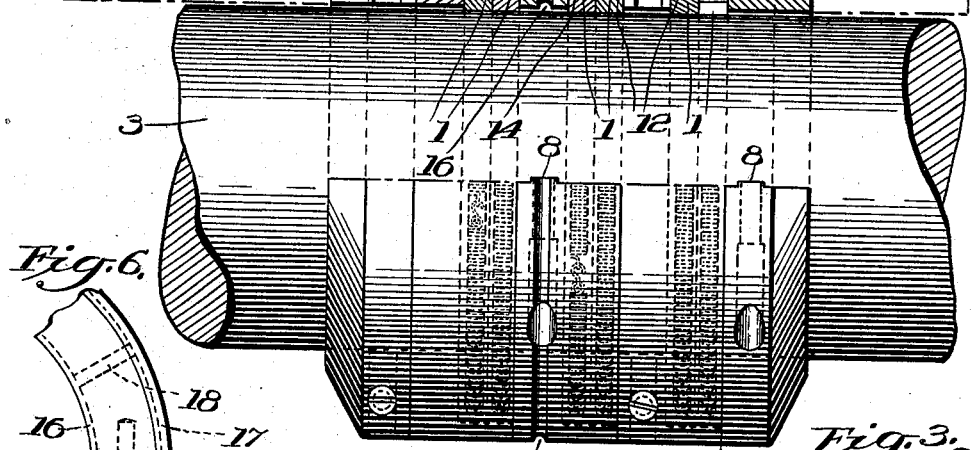
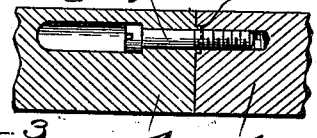
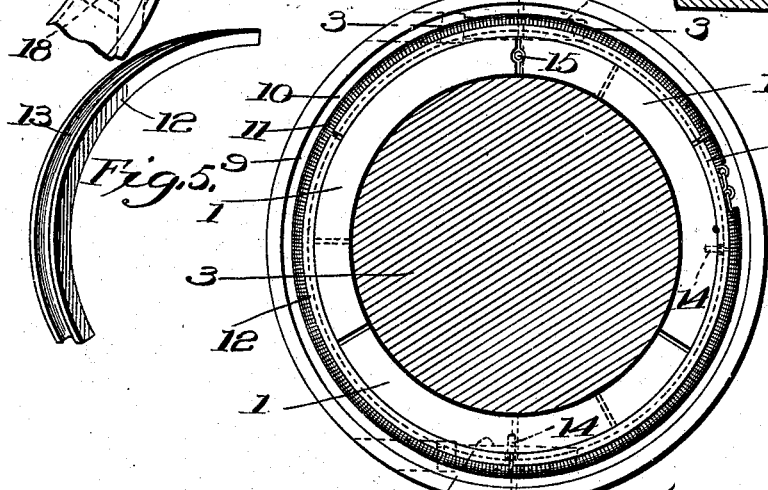
Witnesses:
Allan H. Frost.
F. D. Richards
Inventor:
Joseph Alvah Scott
By H. A. Megrath
Attorney

UNITED STATES PATENT OFFICE.

JOSEPH ALVAH SCOTT, OF NEW YORK, N. Y., ASSIGNOR TO COCKBURN BARROW & MACHINE COMPANY, OF JERSEY CITY, NEW JERSEY, A CORPORATION OF NEW JERSEY.

ROD-PACKING.

No. 885,651.      Specification of Letters Patent.      Patented April 21, 1908.

Application filed May 14, 1906. Serial No. 316,661.

*To all whom it may concern:*

Be it known that I, JOSEPH ALVAH SCOTT, a citizen of the United States, and a resident of the city of New York, State of New York, have invented certain new and useful Improvements in Rod-Packing, of which the following is a specification.

My invention relates to improvements in packing for piston or other rods or steam stuffing boxes in which metallic rings are caused to bear closely against the rod by uniformly distributed spring pressure, and embodies particularly means by which the steam or fluid is prevented from entering behind the packing and the interior of the stuffing boxes, thereby causing undue pressure of the packing upon the rod.

It also embodies means by which, if by chance steam should get behind the packing, the water of condensation may be easily collected and removed.

One embodiment of the invention is illustrated in the accompanying drawings, in which the same reference characters refer to the same parts in the several views.

In the drawing: Figure 1 is a view, partly in section, of the packing, in which a stuffing box and its glands are indicated in dotted outline. Fig. 2 is a transverse section on line 2—2 of Fig. 1. Fig. 3 is a section on line 3—3 of Fig. 2. Fig. 4 is a fragmentary view of the periphery of one of the spring holding rings at its meeting ends. Fig. 5 is a perspective view of a portion of said ring. Fig. 6 is a side view of one of the keepers at its meeting ends.

In the particular embodiment of the invention herein selected for illustration, I have shown it applied to a piston rod but it may be applied to any other rod.

My improved packing comprises one or more rings 1, each of which is divided into segments which are held in place in the stuffing box 2 and around the rod 3 by means of a keeper 4 which is clamped between rings 5 at either end of the stuffing box by means of the usual gland 6. These rings are preferably split at one place and are made to fit snugly within the stuffing box. The ends of the ring are held together by means of a bolt 7. The ends are also provided with a tongue and groove connection 8 whereby the ends are securely held in alinement.

I may use in my construction one or more keepers and packing rings, but as the construction of all is substantially the same, the description of one will be sufficient. This keeper like the clamping rings is also preferably made in one piece having split ends provided with tongue and groove connections to keep them in alinement and also with a bolt to clamp the ends together and hold the keeper around the rod. This keeper is rabbeted at 9 to form a recess 10 within which the packing rings (as here shown two) are contained, it being understood that said chamber is of substantially the same length as the width of the two rings contained therein, so that when the parts are clamped together between the clamping rings 5 the packing rings and clamping rings and keeper will be as nearly as possible steam-tight.

The packing rings are preferably made in three segments, and the edges of the segments of each ring are placed in stepped or staggered relations to each other to prevent steam or fluid leaking or passing between the rings. To cause the packing rings to bear closely against the rod, I use a coiled spring band 11 which extends annularly around the periphery of the packing rings. Such a construction exerts a uniform pressure and compresses the ring equally against the entire circumference of the rod.

To afford a seat for the spring and also to effectually close the joints at the periphery of the packing ring at the meeting ends of the segments, I use a band or seat 12 which is also made of segments. The periphery of this band is provided with a groove 13 in which the spiral spring is seated. The meeting edges of one of these bands are arranged in staggered relation to the meeting edges of the other band and also in staggered relation to the meeting edges of the segments forming the packing ring.

To keep the bands in staggered relation with respect to the packing ring, one of the said segments of each of said rings is provided with a pin 14 which projects from the periphery thereof and between the adjacent ends of two segments of the spring holding band. This construction prevents the band from turning annularly on the packing ring. In order to prevent the packing rings from turning annularly with relation to each other, one of the segments of one of the rings is provided with a pin 15 which projects between the meeting edges of two of the segments of the adjacent ring.

In the construction described, the different segments of the packing rings and the seats for the spring break-joints and the pins 14 and 15 prevent the rings and said spring seat or band from turning, thus preventing steam or fluid from escaping not only along the piston but between the joints of the segments. No steam, therefore, should ordinarily escape into the space or recess 10 in the keeper behind the packing rings and thereby exert undue pressure on said rings and cause them to bear unnecessarily on the rod. If, however, the steam should by any possibility escape to get in between the rod and the packing, I provide the following means for disposing of the same or the water of condensation from the steam. On the inner edge of the keeper next to the rod I provide a groove 16 and on the outer edge or periphery of the keeper I also provide a groove 17. These grooves are connected by an opening or openings 18 passing radially through the keeper. By this construction it will be seen that any steam or fluid collecting or escaping between the packing rings and rod will get into the groove 16 and pass through the hole or holes 18 and into the outer groove 17. To dispose of the steam or water condensation or fluid in the outer groove, I provide in the stuffing box an opening 19 into which is tapped or otherwise secured a drip or draw-off pipe 20 through which said liquid or steam is made to pass.

In the construction here shown I have illustrated three keepers and three sets of packing rings and springs and seats, and I have shown the grooves 16 and 17 with the co-acting holes 18 in only one of the keepers, but it is understood that I may use it in others if desired.

Having described my invention, what I claim and desire to secure by Letters Patent is:—

1. In a device of the class described, a ring made up of segments adapted to surround a rod, an outer band on the periphery of said ring also made up of segments, said segments being arranged in staggered relation to those of the ring, and a spiral spring extending annularly around said band to compress the ring upon the rod.

2. In a device of the class described, a segmental packing ring adapted to surround a rod, an outer segmental band overlying said packing ring and having its segments arranged in staggered relation to those of the ring, said segmental bands being grooved annularly on their outer periphery to form a spring seat, and a spiral spring in said seat.

3. In a device of the class described, a segmental packing ring adapted to surround a rod, an outer segmental band overlying said packing ring and having its segments arranged in a staggered relation to those of the ring, a spiral spring extending annularly around the band and adapted to compress the ring upon the rod, and an annular keeper having a recess to receive said ring, band and spring.

4. In a device of the class described, a segmental packing ring adapted to surround a rod, an outer segmental band overlying said packing ring and having its segments arranged in staggered relation to those of the ring, and means to maintain the parts in staggered relation to each other, and a spiral spring extending annularly around said band and adapted to press the ring upon the rod.

5. In a device of the class described, a plurality of segmental rings adapted to surround a rod, the segments of adjacent rings being arranged in staggered relation to each other, outer segmental bands overlying each of said rings and having their segments staggered with respect to said rings and with respect to each other, spiral springs annularly surrounding the band and tending to press the ring snugly against the rod, and keepers provided with recesses adapted to receive the ring, band and springs and to hold them in position within a stuffing box.

6. In a device of the class described, a segmental packing ring adapted to surround a rod, an outer segmental band overlying said packing ring and having its segments in staggered relation to those of the ring, and a spiral spring extending annularly around the said bands, a keeper provided with a recess to receive said rings, band and spring, and annular clamps adapted to surround the rod and located on each face of the keeper to hold the parts in position in a stuffing box.

7. In a device of the class described, an annular keeper adapted to surround a rod, said keeper having a recess therein adapted to receive a packing ring or rings and provided with an annular groove on its inner surface and with an annular groove on its outer surface, said grooves being connected by a hole passing through the keeper.

8. In a device of the class described, an annular keeper adapted to surround a rod, said keeper having a recess therein adapted to receive a packing ring or rings and provided with an annular groove on its inner surface and with an annular groove on its outer surface, said grooves being connected by a hole passing through the keeper, and means communicating with the annular groove for the purposes set forth.

In witness whereof, I have hereunto set my hand at the city, county and State of New York, this 12th day of May, 1906.

JOSEPH ALVAH SCOTT.

In presence of—
HENRY BOSSONG,
JOHN J. RANAGAN.